United States Patent
Cronin

(10) Patent No.: US 9,648,452 B1
(45) Date of Patent: May 9, 2017

(54) WIRELESS COMMUNICATION DRIVEN BY OBJECT TRACKING

(71) Applicant: ProSports Technologies, LLC, Miami, FL (US)

(72) Inventor: John Cronin, Bonita Springs, FL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/732,533

(22) Filed: Jun. 5, 2015

Related U.S. Application Data

(60) Provisional application No. 62/008,488, filed on Jun. 5, 2014.

(51) Int. Cl.
*H04W 4/02* (2009.01)
*H04W 8/20* (2009.01)
*H04W 4/18* (2009.01)
*H04W 4/12* (2009.01)

(52) U.S. Cl.
CPC ........... *H04W 4/02* (2013.01); *H04W 4/12* (2013.01); *H04W 4/18* (2013.01); *H04W 8/20* (2013.01)

(58) Field of Classification Search
CPC ........... H04W 4/02; H04W 4/18; H04W 4/12; H04W 8/20
See application file for complete search history.

(56) References Cited

U.S. PATENT DOCUMENTS

| | | | |
|---|---|---|---|
| 5,754,636 A | 5/1998 | Bayless et al. | |
| 6,824,480 B2 | 11/2004 | John et al. | |
| 7,583,901 B2 | 9/2009 | Nakagawa et al. | |
| 7,715,723 B2 | 5/2010 | Kagawa et al. | |
| 7,899,159 B1 | 3/2011 | Croak et al. | |
| 8,027,451 B2 | 9/2011 | Arendsen et al. | |
| 8,175,913 B2 | 5/2012 | Checketts et al. | |
| 8,188,878 B2 | 5/2012 | Pederson et al. | |
| 8,540,583 B2 | 9/2013 | Leech | |

(Continued)

FOREIGN PATENT DOCUMENTS

| | | |
|---|---|---|
| CN | 1741548 | 3/2006 |
| CN | 101815100 | 8/2010 |

(Continued)

OTHER PUBLICATIONS

PCT Application No. PCT/US2015/043882 International Search Report and Written Opinion mailed Oct. 28, 2015.

(Continued)

*Primary Examiner* — Chuong A Ngo
(74) *Attorney, Agent, or Firm* — Polsinelli LLP

(57) ABSTRACT

Information about the real-time location of an object (e.g., a football) within a venue (e.g., a sport stadium), as determined by an object tracking system, may be used to generate communications that are then transmitted via wireless transmitters to one or more user devices (e.g., smartphones of venue spectators) located within the venue. The communications may be triggered by particular event triggers (e.g., the football enters a goal area, the football travels a particular distance, the football reaches a particular velocity, the football reaches a particular height), and the communication may be based on the event trigger that was reached. The wireless transmitter may be a local wireless transmitter, so that only user devices within the venue receive the communication.

20 Claims, 5 Drawing Sheets

(56) References Cited

U.S. PATENT DOCUMENTS

| | | |
|---|---|---|
| 8,565,607 B2 | 10/2013 | Kang et al. |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,626,465 B2 | 1/2014 | Moore et al. |
| 8,630,216 B2 | 1/2014 | Deivasigamani et al. |
| 8,660,501 B2 | 2/2014 | Sanguinetti |
| 8,687,965 B2 | 4/2014 | Pederson et al. |
| 8,706,044 B2 | 4/2014 | Chang et al. |
| 8,724,723 B2 | 5/2014 | Panicker et al. |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 2007/0022445 A1 | 1/2007 | Arseneau |
| 2007/0140176 A1 | 6/2007 | Bachenberg |
| 2009/0036205 A1 | 2/2009 | Seacal et al. |
| 2009/0310971 A1 | 12/2009 | Kim et al. |
| 2010/0082980 A1 | 4/2010 | Shiraki |
| 2010/0283630 A1* | 11/2010 | Alonso ............... H04Q 9/00 340/870.11 |
| 2010/0289644 A1 | 11/2010 | Slavin et al. |
| 2011/0055862 A1 | 3/2011 | Harp et al. |
| 2011/0294547 A1 | 12/2011 | Ni |
| 2011/0306326 A1 | 12/2011 | Reed et al. |
| 2012/0078667 A1 | 3/2012 | Denker et al. |
| 2012/0158995 A1 | 6/2012 | McNamee et al. |
| 2012/0314797 A1 | 12/2012 | Kummetz et al. |
| 2013/0126713 A1 | 5/2013 | Haas et al. |
| 2013/0141555 A1 | 6/2013 | Ganick et al. |
| 2013/0208184 A1 | 8/2013 | Castor et al. |
| 2013/0217332 A1 | 8/2013 | Altman et al. |
| 2013/0279917 A1 | 10/2013 | Son et al. |
| 2013/0303192 A1 | 11/2013 | Louboutin |
| 2013/0317835 A1 | 11/2013 | Mathew |
| 2013/0317916 A1 | 11/2013 | Gopalakrishnan et al. |
| 2013/0328917 A1 | 12/2013 | Zhou |
| 2013/0330088 A1 | 12/2013 | Oshima et al. |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0336222 A1 | 12/2013 | Lu et al. |
| 2013/0336662 A1 | 12/2013 | Murayama et al. |
| 2013/0337787 A1 | 12/2013 | Yamada et al. |
| 2013/0343762 A1 | 12/2013 | Murayama et al. |
| 2014/0037296 A1 | 2/2014 | Yamada et al. |
| 2014/0062773 A1 | 3/2014 | MacGougan |
| 2014/0065962 A1 | 3/2014 | Le |
| 2014/0071221 A1 | 3/2014 | Dave |
| 2014/0098241 A1 | 4/2014 | Stout et al. |
| 2014/0105084 A1 | 4/2014 | Chhabra |
| 2014/0139380 A1 | 5/2014 | Ouyang |
| 2014/0141803 A1 | 5/2014 | Marti |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0171114 A1 | 6/2014 | Marti |
| 2014/0173692 A1 | 6/2014 | Srinivasan |
| 2014/0180820 A1 | 6/2014 | Louboutin |
| 2014/0191979 A1 | 7/2014 | Tsudik |
| 2014/0200053 A1 | 7/2014 | Balasubramanian |
| 2014/0222335 A1 | 8/2014 | Piemonte |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0256478 A1* | 9/2014 | Gale ............... A63B 43/004 473/465 |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0357226 A1 | 12/2014 | Charugundla |
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |
| 2014/0375217 A1 | 12/2014 | Feri et al. |
| 2015/0011242 A1 | 1/2015 | Nagaraj |
| 2015/0026623 A1 | 1/2015 | Horne |
| 2015/0031397 A1 | 1/2015 | Jouaux |
| 2016/0057610 A1 | 2/2016 | Cronin |

FOREIGN PATENT DOCUMENTS

| | | |
|---|---|---|
| CN | 102273323 | 12/2011 |
| CN | 102843186 | 12/2012 |
| CN | 202857947 | 4/2013 |
| CN | 103297888 | 9/2013 |
| CN | 103490812 | 1/2014 |
| EP | 2 549 442 | 1/2013 |
| KR | 10 2013-0116417 | 10/2013 |
| WO | WO 2009/104921 | 8/2009 |
| WO | WO 2013/070271 | 5/2013 |
| WO | WO 2013/109934 | 7/2013 |
| WO | WO 2014/085694 | 6/2014 |
| WO | WO 2016/032714 | 3/2016 |

OTHER PUBLICATIONS

U.S. Appl. No. 14/819,386 Office Action mailed Sep. 24, 2015.

PCT/US15/43882, Disposable Connectable Wireless Communication Receiver, Aug. 5, 2015.

About ByteLight, Date of Download: Jul. 18, 2014, www.bytelight.com/about.

"Create Innovative Services with Play APPs", Date of Download: Jan. 16, 2014, http://www.oledcomm.com/LIFI.html, Oledcomm—France LiFi.

Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.

Dawson, Keith; "LiFi in the Real World" All LED Lighting—Illuminating the Led Community, Jul. 31, 2013.

Gorman, Michael; "Outstanding Technology brings visible light communication to phones and tablets via dongle and LEDs", Edgadget International Editions, Jul. 16, 2012.

Haas, Harald; "Delivering safe and secure wireless communications", pureLiFi. Date of download: Jan. 16, 2014 http://purelifi.co.uk/.

Hao et al., Tian; "COBRA: Color Barcode Streaming for Smartphone Systems", MobiSys '12 Proceedings of the 10th International conference on Mobile systems, applications, and Services. pp. 85-98, Jun. 25, 2012.

Haruyama, Shinichiro; "Visible Light Communications: Recent Activities in Japan", Smart Spaces: A Smart Lighting ERC Industry—Academia Day at BU Photonics Center, Boston University. Feb. 8, 2011.

Komine, Toshihiko; Nakagawa, Masao; "Integrated System of White LED Visible-Light Communication Power-Line Communication", Dept. of Information and Computer Science, Keio University. Feb. 2003.

Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.

(56) References Cited

OTHER PUBLICATIONS

LiFi Overview—Green wireless mobile communication—LiFi Technology. Date of download: Jan. 16, 2014.

Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.

Little, Thomas; "Exploding Interest in Visible Light Communications: An Applications Viewpoint", Smart Light Annual Industry—Academia Days, Feb. 13-15, 2012.

Montero, Eric, "Design and Implementation of Color-Shift Keying for Visible Light Communications", Sep. 2013, McMaster University.

Nguyen et al., "A Novel like switching scheme using pre-scanning and RSS prediction in visible light communication networks", EURASIP Journal on Wireless Communications and Networking, 2013.

Ogawa; "Article about VLC Guidance developed", Visible Light Communications Consotium (VLCC), Aug. 31, 2012.

Ogawa; "iPhone app from CASIO", Visible Light Communications Consotium (VLCC), Apr. 26, 2012.

Pacchloll, David; "Optical wireless may be the answer to dropped calls, and more", PennState University, Oct. 2, 2013.

Povey, Gordon, "VLC for Location, positioning and navigation", Jul. 27, 2011, http://visiblelightcomm.com/vlc-for-location-positioning-and-n . . . .

Spaarmann, Stefan; "Opportunities for a Sustainable Communications Technology". 2009.

Thanigavel, M.; "Li-Fi Technology in Wireless Communication", International Journal of Engineering Research & Technology (IJERT), ISSN: 2278-0181, vol. 2 Issue 10, Oct. 2013.

"Visible Light Communication", HWCommunications . . . Creating the next generation of solutions. Date of Download: Aug. 10, 2014. http://cyber.hwcomms.com/cyber/VLC.

"Visible Light Communication for Mobile Phones.mp4", Youtube, Apr. 26, 2012.

Won, Eun Tae; "Visible Light Communication: Tutorial", Project: IEEE P802.15 Working Group for Wireless Personal Area Networks (WPANs), Mar. 9, 2008.

Zhang et al., Weizhi; "Asynchronous indoor positioning system based on visible light communications", Optical Engineering 53(4), 045105 (Apr. 2014).

PCT Application No. PCT/US2015/033613 International Search Report and Written Opinion mailed Sep. 1, 2015.

U.S. Appl. No. 14/732,363, John Cronin, Managing Third Party Interactions With Venue Communications, Jun. 5, 2015.

U.S. Appl. No. 14/732,400, John Cronin, Zone Based Wireless Player Communications, Jun. 5, 2015.

U.S. Appl. No. 14/731,901, John Cronin, Managing Smart Tickets, Jun. 5, 2015.

U.S. Appl. No. 14/819,386, John Cronin, Disposable Connectable Wireless Communication Receiver, Aug. 5, 2015.

U.S. Appl. No. 14/731,901 Office Action mailed Oct. 24, 2016.

U.S. Appl. No. 14/819,386, Office Action mailed Aug. 5, 2016.

U.S. Appl. No. 14/732,400, Office Action mailed May 10, 2016.

U.S. Appl. No. 14/819,386, Final Office Action mailed Mar. 24, 2016.

U.S. Appl. No. 14/732,400, Final Office Action mailed Oct. 31, 2016.

\* cited by examiner

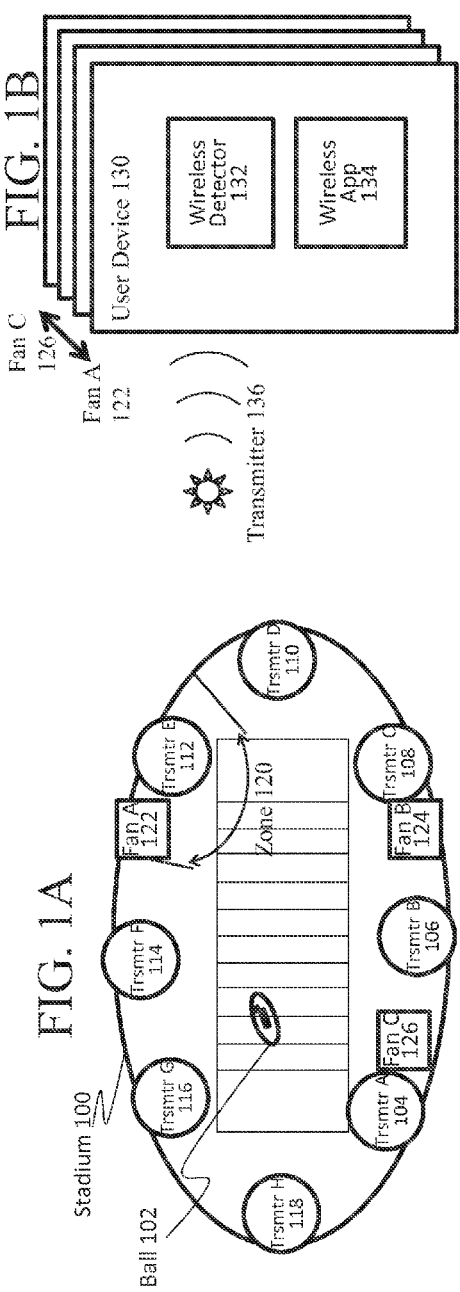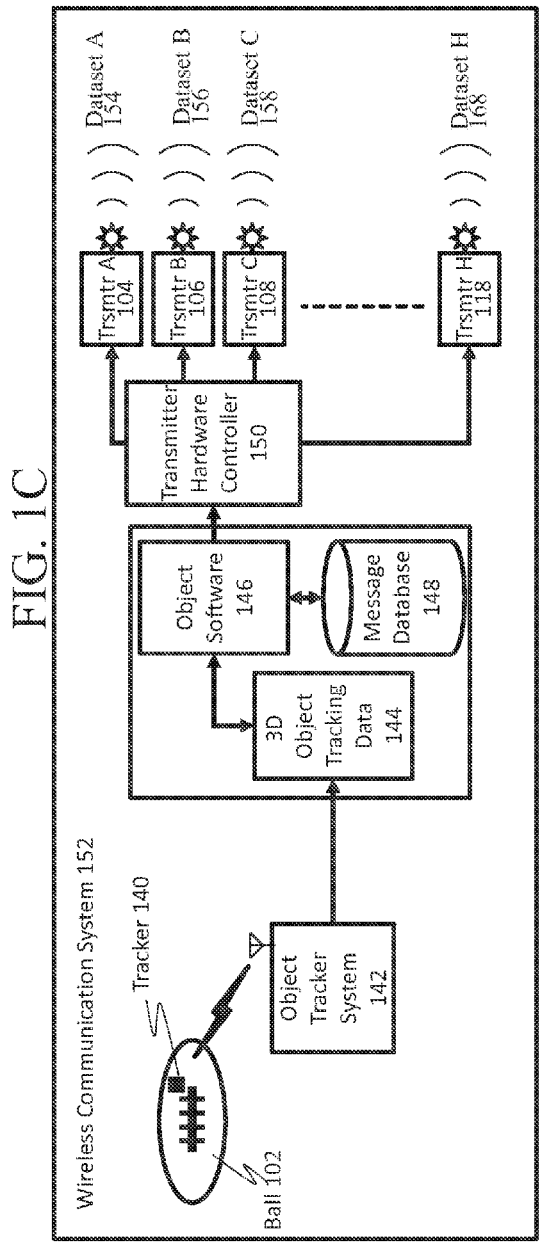

FIG. 5

Alternate automatic communication scenarios 500

510 - Use height of ball to create a message based on the height of the ball; for example, "What a great field goal!"

520 - Instead of finding the nearest Wireless Transmitter, find the farthest Wireless Transmitter and send a short video clip of a close-up shot of the play.

530 - Use Ball position close to the goal line to create a message like, "Getting Close."

540 - When Ball trajectory indicates a handoff, followed by random bouncing recognizable as a fumble, create a message such as, "Fumble! What a great game!"

550 - When Ball position is beyond the side lines, send a message like, "Out of bounds!".

FIG. 4

Message Database 148

| 410 Record | 420 Distance | 430 Generic Message |
|---|---|---|
| 1 | 1 - 5 | Let's Go Team! |
| 2 | 1 - 5 | We Can Do It Team! |
| 3 | 5 - 10 | What Great Progress! |
| 4 | 10 - 50 | Wow! Let's give them a cheer! |
| 5 | > 50 | Wow, what a play! $1.00 OFF Miller Beer Use This Coupon [Barcode] |

WIRELESS COMMUNICATION DRIVEN BY OBJECT TRACKING

CROSS-REFERENCE TO RELATED APPLICATIONS

The present application claims the priority benefit of U.S. provisional application No. 62/008,488 filed Jun. 5, 2014 and entitled "VLC Control Driven by 3D Ball Movement," the disclosure of which is hereby incorporated by reference.

BACKGROUND

Field of Invention

The present invention generally relates to wireless communication devices. More specifically, the present invention relates to wireless communication of data driven by 3D object movement.

Description of the Related Art

Traditionally, the field of digital communications includes wired and wireless transfer of information. Digital communications may include direct communications in which information is transmitted from a sender device to a recipient device, and may also include "indirect" communications in which information is transmitted from a sender device, through one or more "intermediary" or "middleman" devices, and eventually to a recipient device.

One example of wired transfer includes data transmitted from a sender device to a recipient device using a Universal Serial Bus (USB) cable. Another example of a wired transfer includes data transmitted within a private Local Area Network (LAN) from a sender device to a router through a sender Ethernet cable, and from the router to a recipient device through a recipient Ethernet cable.

One example of wireless transfer includes data transmitted from a sender device to a recipient device using a Bluetooth protocol connection. Another example of a wired transfer includes data transmitted within a private Wireless Local Area Network (WLAN) from a sender device to a router through a wireless Wi-Fi connection, and from the router to a recipient device through a wireless Wi-Fi connection. Another example of wireless transfer is Visible Light Communication (VLC).

Traditional wireless communications may be received and read by any recipient device within a range in which information transmitted wirelessly by a sender device can be interpreted. In some cases, information transmitted wirelessly by a sender may be within range of an unintended recipient.

Advertising a brand, a product, or a service is often an effective means for a business to obtain new customers and reinforce loyalty in existing customers. Advertising can be particularly effective if targeted at the correct audience, such as when a sport fan is told that buying a particular product will support his/her favorite team. Often, seating at sport stadiums during sporting events is divided into "sections" devoted to fans of one of the teams playing.

Advertising can be a particularly useful source of revenue during sporting events, such as football games. By using advertising, revenues may be raised, the cost of tickets may be brought down, and more fans may be allowed to go to a particular sports game.

Thus, a means of targeted local wireless advertising is needed.

SUMMARY OF THE CLAIMED INVENTION

One exemplary method for targeted advertisement transmission describes receiving advertisement content information corresponding to an advertisement. The method also describes receiving advertisement placement information identifying a transmitter. The method also describes executing instructions stored in memory. The execution of instructions by a processor performs a set of operations. The operations include storing the advertisement content information and the advertisement placement information in an advertisement database. The operations also include generating a transmittable advertisement signal based on the advertisement content information. The operations also include transmitting the transmittable advertisement signal through the identified transmitter to a plurality of recipient devices in range of the identified transmitter. The operations also include charging an advertisement provider based on the transmission of the transmittable advertisement signal.

One exemplary system for targeted advertisement transmission provides a wireless transmitter, a memory, and a processor coupled to the memory and the wireless transmitter. Execution of instructions stored in the memory by the processor performs a set of operations. The operations include receiving advertisement content information corresponding to an advertisement. The operations also include receiving advertisement placement information identifying the wireless transmitter. The operations also include storing the advertisement content information and the advertisement placement information in an advertisement database. The operations also include generating a transmittable advertisement signal based on the advertisement content information. The operations also include transmitting the transmittable advertisement signal through the identified transmitter to a plurality of recipient devices in range of the identified transmitter. The operations also include charging an advertisement provider based on the transmission of the transmittable advertisement signal.

One exemplary non-transitory computer-readable storage medium is also described, the non-transitory computer-readable storage medium having embodied thereon a program executable by a processor to perform an exemplary method for targeted advertisement transmission. The exemplary program method describes receiving advertisement content information corresponding to an advertisement. The program method also describes receiving advertisement placement information identifying the wireless transmitter. The program method also describes storing the advertisement content information and the advertisement placement information in an advertisement database. The program method also describes generating a transmittable advertisement signal based on the advertisement content information. The program method also describes transmitting the transmittable advertisement signal through the identified transmitter to a plurality of recipient devices in range of the identified transmitter. The program method also describes charging an advertisement provider based on the transmission of the transmittable advertisement signal.

BRIEF DESCRIPTION OF THE DRAWINGS

FIG. 1A illustrates an exemplary transmitter arrangement in a football stadium.

FIG. 1B illustrates an exemplary user device.

FIG. 1C illustrates an exemplary stadium-based wireless communication system.

FIG. 4 illustrates an exemplary message database.

FIG. 5 illustrates exemplary alternate automatic communication scenarios.

DETAILED DESCRIPTION

Figure 3:
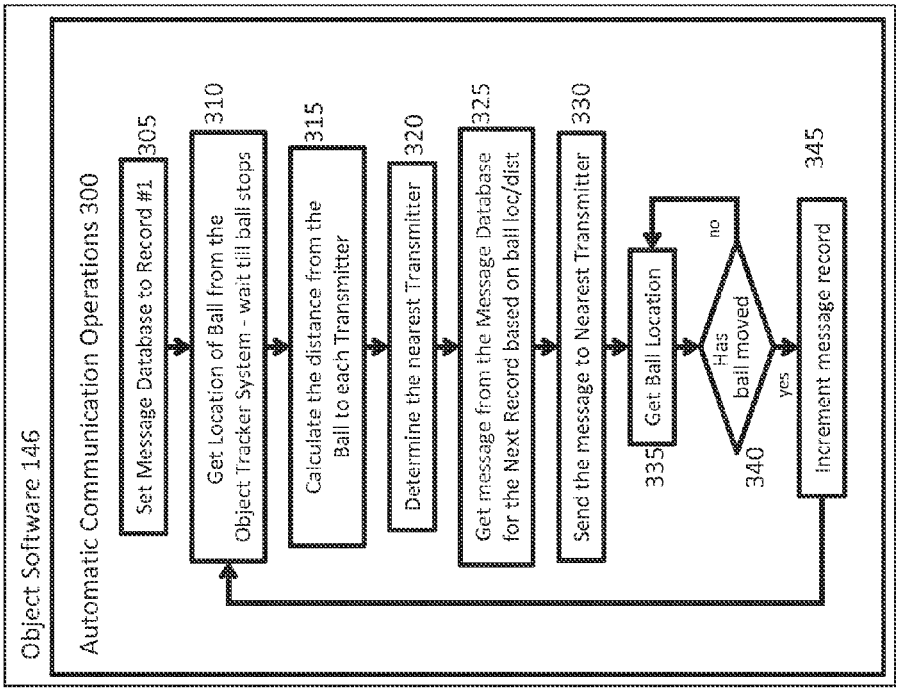
FIG. 3 is a flow diagram illustrating exemplary automatic communication operations.

Information about the real-time location of an object (e.g., a football) within a venue (e.g., a sport stadium), as determined by an object tracking system, may be used to generate communications that are then transmitted via wireless transmitters to one or more user devices (e.g., smartphones of venue spectators) located within the venue. The communications may be triggered by particular event triggers (e.g., the football enters a goal area, the football travels a particular distance, the football reaches a particular velocity, the football reaches a particular height), and the communication may be based on the event trigger that was reached. The wireless transmitter may be a local wireless transmitter, so that only user devices within the venue receive the communication.

FIG. 1A illustrates an exemplary ecosystem including multiple transmitters and multiple recipient devices.

The ecosystem of FIG. 1A includes a stadium 100. The stadium 100 may be a sport stadium (e.g., a football stadium, a soccer stadium), a sport court (e.g., a tennis court), a sport pool (e.g., a swimming pool, a diving pool, a water polo pool), a sport table (e.g., a table tennis table), or another type of public venue where a sporting event or audience-geared performance may take place (e.g., a lecture hall/venue, a concert hall/venue, a political rally hall/venue, a mall, a store, a restaurant/bar, a transit hub, a public transit/transport vehicle).

The stadium 100 of FIG. 1A includes eight transmitters, labeled as Transmitter A 104, Transmitter B 106, Transmitter C 108, Transmitter D 110, Transmitter E 112, Transmitter F 114, Transmitter G 116, and Transmitter H 118. In other embodiments, more transmitters, or fewer transmitters, may be used.

Each transmitter of the transmitters of FIG. 1A may be any type of information transmission system. For example, each transmitter may transmit information using a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction transmitter, a magnetic resonance transmitter, an electromagnetic radiation transmission module, a visible light communication (VLC) transmission lamp/laser/module, a laser transmission module, a speaker (e.g., audible sound transmitter, ultrasonic transmitter, infrasonic transmitter) with or without noise cancelling features, or some combination thereof. Each transmitter may include any number of sub-transmitters.

The stadium 100 of FIG. 1A includes three audience members ("fans"), including Fan A 122 (located near Transmitter E 112 and within Zone 120), Fan B 124 (located near Transmitter C 208), and Fan C 126 (located near Transmitter A 104). Each of these audience members may have a user device 130 as described in FIG. 1B. In other situations, a stadium 100 may have more or fewer audience members.

The transmitter may be any type of transmission system. For example, each transmitter may transmit a dataset using a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction transmitter, a magnetic resonance power transmitter, an electromagnetic transmission module, a visible light communication (VLC) transmission module, a laser transmission module, an ultrasonic transmission module, an infrasonic transmission module, or some combination thereof. Each transmitter may include any number of sub-transmitters.

Each transmitter may allow for localized transmission of data within a particular zone. For example, Transmitter E 112, located in Zone 120, may transmit data to user devices physically located in Zone 120. For example, Transmitter E 112 may transmit a Dataset E to user devices 130 in Zone 120 (e.g., including the user device of Fan A 122) using Bluetooth, an ultrasonic speaker system, or an audience-facing VLC light transmitter.

Alternately, a different transmitter could transmit data to Zone 120. For example, Transmitter A 104 could transmit data across the sport field to Zone 120. For example, Transmitter A 104 may transmit a Dataset A 154 to user devices 130 in Zone 120 (e.g., including the user device of Fan A 122) using across-stadium VLC light transmitters (e.g., which may used focused beams or lasers), directed radio waves, or directed ultrasonic audio speakers with noise cancelling for other parts of the stadium.

Each zone may be one of a variety of shapes. For example, a zone could be substantially cone-shaped, such as if the transmitter is a visible light communication (VLC) transmission lamp (e.g., a fluorescent lamp or incandescent lamp or light emitting diode emitting light at least partly within the visible light spectrum), which communicates information via light (e.g., by flickering the light at speeds faster than can typically be discerned by human vision). A transmitter may also have a substantially cone-shaped transmission zone 110 if, for example, the transmitter 105 is a speaker, such as an audible-frequency speaker, an ultrasonic-frequency speaker, an infrasonic frequency speaker, or some combination thereof. A transmitter can alternately have a differently-shaped transmission zone, such as a transmission zone that is at least partly sphere-shaped or ovoid-shaped. For example, the transmitter could be a local Bluetooth transmitter transmitting circularly around to surrounding recipient devices. A transmission zone could also be a straight line or rectangle if, for example, the transmitter uses one or more lasers to transmit information.

While the transmitters may transmit data to any user device 130 in their respective zone, in some cases, the data may be protected so that only some user devices (e.g., user devices authorized after purchasing a ticket) can read the transmission. This can be performed by registering authorized user devices 130 in an authorization database or data structure (not shown), registering owners of the user devices 130 in an authorization database or data structure (not shown), sending a password to the user device 130 through which the transmitted data can be read, or sending a security key (e.g., an encryption/decryption key) that can be used to decrypt the transmitted data for reading.

The stadium 100 may also include an object to the tracked, which in FIG. 1A is illustrated as a ball 102. The ball 102 may be any sort of ball (e.g., a football, a soccer ball, a rugby ball, a basketball, a golf ball, a baseball, a softball, a volleyball a football, a soccer ball, a rugby ball, a baseball, a volleyball, a tennis ball, a table tennis ball), or may be another type of sports equipment (e.g., a hockey puck, a frisbee, or a badminton shuttlecock). The object to be tracked may in some cases be associated with a single athlete as opposed to associated with a team sport generally (e.g., an athlete's clothing or gear, a driver's racecar, a rider's bike, a rider's motorcycle, a rider's horse saddle or gear). The object (e.g., the ball 102) may include a tracker 140 as described further in FIG. 1C.

The transmitters of FIG. 1A may be used inside of or otherwise associated with an event venue during an event. For example, the transmitters may be used during entertainment or cultural events that are presented at a theater, gymnasium, stadium, or other facility to a group of people. It should be understood that any reference to the stadium 100 herein may also refer to any other event venue mentioned above as well. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as a museum, historic home, and the like. References to sports games herein may also refer to any other events mentioned above as well.

FIG. 1B illustrates an exemplary user device.

The user device 130 may be any type of computing device, such as a smartphone, a tablet device, a wearable device (which may be any type of wearable device as described in relation to the recorder device 125 of FIG. 1), a laptop computer, a portable video game console, a portable media device.

Figure 7:
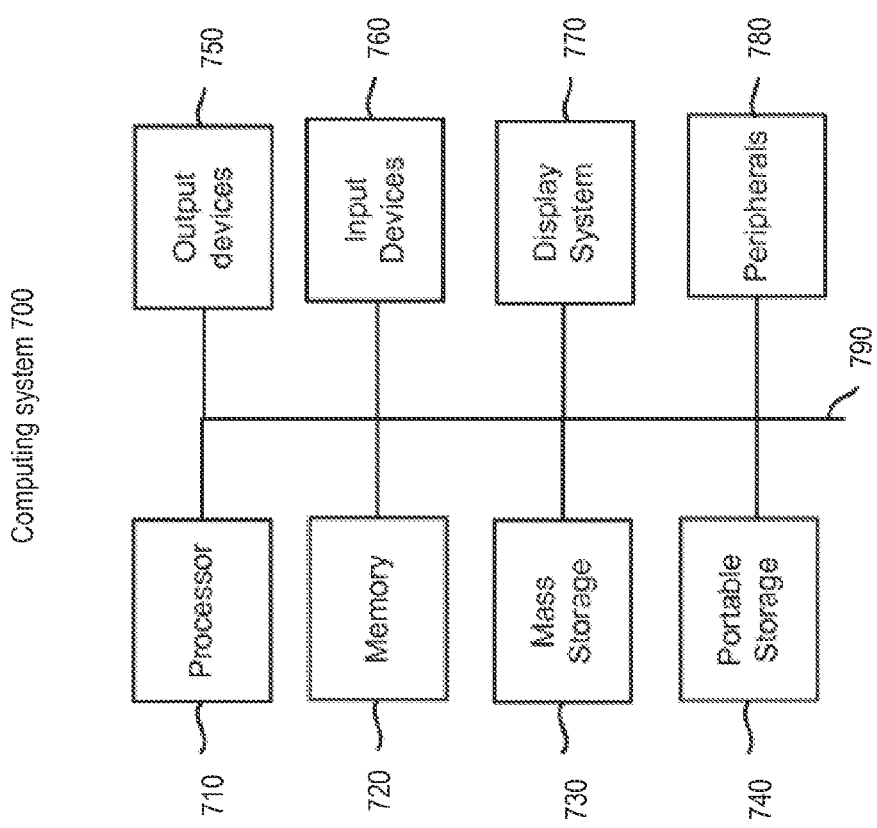
FIG. 7 is a block diagram of an exemplary computing device that may be used to implement an embodiment of the present invention.

The user device 130 may include a computer-readable memory (not shown), such as the mass storage device 730 or the portable storage device 740 of FIG. 7, and a processor (not shown), such as the processor unit 710 of FIG. 7.

The user device 130 can include a wireless detector 132, which may be a hardware module through which the transmission of the transmitter can be read, and may be a detector or receiver of any of the types described above in relation to the transmitters of FIG. 1A. For example, the wireless detector 132 may include, for example, the ability to receive information using a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction receiver, a magnetic resonance receiver, an electromagnetic radiation receiver module, a visible light communication (VLC) receiver module, a laser transmission receiver module, a microphone (e.g., audible sound receiver, ultrasonic receiver, infrasonic receiver) with or without noise cancelling features, or some combination thereof. The transmission receiver 160 may include any number of sub-receivers. The wireless detector 132 may include hardware components, software components (e.g., stored in memory and executed by the processor), or some combination thereof.

The user device may also include a wireless software application ("app") 134 which may be used to read the data transmitted by the transmitters of FIG. 1A. The wireless app 134 may be stored in memory and executed by the processor. The wireless app 134 may include a sport-tracking function, a social media function, an e-mail function, or a messaging function, and may be operable to read textual data and, optionally, other types of data (e.g., images, videos, audio, or hyperlinks to web pages) transmitted by at least one of the transmitters of FIG. 1A. The wireless software application ("app") 134 may in some cases include specialized hardware as well as software.

FIG. 1C illustrates an exemplary stadium-based wireless communication system.

The wireless communication system 152 of FIG. 1C includes an object to be tracked, in this case, is ball 102. Ball 102 includes a tracker 140 that allows location and movement information about the ball 102 to be tracked in real-time. For example, the tracker 140 could determine the location, altitude, velocity, speed, momentum, spin, or trajectory of the ball 102. The tracker 140 may include a variety of sensors to perform this tracking function (e.g., a Global Positioning System module, an accelerometer, a gyroscope, an altimeter, a radar sensor, a sonar sensor, or some combination thereof).

Some or all of the tracking of the object (e.g., the ball 102 in FIG. 1C) may be performed by a tracker external to the object to be tracked (e.g., the ball 102 in FIG. 1C). For example, the location, altitude, velocity, speed, momentum, spin, or trajectory of the ball 102 could be tracked using a computer vision system that includes sensors (e.g., visible-light cameras, infrared/thermal cameras, night vision cameras, ultraviolet cameras, laser rangefinders, radar sensors, sonar sensors, or some combination thereof) located at one or more points throughout the stadium 100. Such sensors could be part of the object tracker system 142.

The location and movement of the ball 102 may thus be tracked via a tracker 140 coupled to the ball, one or more sensors in the stadium coupled to the object tracker system 142, or some combination thereof. Regardless of how the ball 102 is tracked, the object tracker system 142 may then include a computer system, such as the computer system 700 of FIG. 7 that then receives this information (e.g., location, altitude, velocity, speed, momentum, spin, or trajectory) about the tracked object (e.g., the ball 102).

The object tracker system 142 may then provide 3D object tracking data 144 based on the information it received from the tracker 140 or generated from sensors of the object tracker system 142. The 3D object tracking data 144 may include the same data as was first recorded by the tracker 140 or sensors of the object tracker system 142, and/or may include data calculated based on the data recorded first recorded by the tracker 140 or sensors of the object tracker system 142 (e.g., a momentum calculated by multiplying the mass of the ball 102 by a velocity extrapolated based on two tracked locations of the ball 102 and the timestamps of those locations). The 3D object tracking data 144 may be real-time data, or may be sampled periodically (e.g., based on a predetermined time period, based on movement or lack thereof, based on manual sensor-requests from an administrator device, based on particular game events within the sports game, or some combination thereof).

The object tracker system 142 may provide the 3D object tracking data 144 to an object software 146, which may have access to a message database 148. The object software may be executed on the same computer system as the object tracker system 142, or on a different computer system communicatively coupled (e.g., in a wired or wireless fashion) to the computer system of the object tracker system 142. The computer system executing the object software 146 may be any type of computer system, such as the computer system 700 of FIG. 7.

The message database 148 may be stored at a storage device, which may be a mass storage device 730 or a portable storage device 740 of FIG. 7, and may be located at the computer device of the object tracker system 142, the computer device of the object software 146, or a separate computer device or storage-only device. The message database 148 may take the form of a database, a table, a list, an array, an arraylist, a tree, or any other type of data structure used to store multiple entries.

The message database 148 may be used to store various messages to be transmitted based on the movement of the object (e.g., the ball 102), which the object software 142 may then compare to the actual object movement data to determine an action. For example, if the object software 142 may receive 3D object tracking data 144 from the object tracker system 142 that indicates that the ball 102 has traveled a distance of over 50 yards in a single play. The object software 142 may then check the message database 148. According to the exemplary message database 148 of FIG. 4, a movement of over 50 yards by the ball 102 is associated with a "Wow, what a play! $1.00 OFF Miller Beer" message, which includes a redeemable barcode-based coupon. The object software 142 may then send this message (with its included coupon) to a transmitter hardware controller 150, which may then push the message to one or more of the transmitters (e.g., Transmitter A 104, Transmitter B 106, Transmitter C 108, Transmitter D 110, Transmitter E 112, Transmitter F 114, Transmitter G 116, and/or Transmitter H 118) of the stadium 100. For example, the object software 142 may decide to transmit the message, using the transmitter hardware controller 150, via Transmitter A 104 as Dataset A 154, via Transmitter B 106 as Dataset B 156, via Transmitter C 108 as Dataset C 158, and via Transmitter H as Dataset H 168.

Which transmitters are used to transmit a particular message may be determined by the object software 146, by the message database 148, by a manual input from an administrator, by the object tracker system 142, or some combination thereof. For example, each message may be transmitted through the transmitters closest to the tracked object (e.g., the ball 102) (or those transmitters with transmission zones closest to the tracked object) so that nearby audiences may enjoy the message, through the transmitters farthest from the tracked object (e.g., the ball 102) (or those transmitters with transmission zones furthest from the tracked object) so that faraway audiences better understand what is happening in an ongoing game even when the action moves away. A message may also be directed to a particular group of audience members, such as a "home team fan seating section" or an "away team fan seating section," or to reward a group of fans that are cheering particularly loudly, or to compensate/inform a group of fans whose view has been unexpectedly blocked.

The messages in the message database 148 may include text, images, video, sound, documents, maps, files, monetary payments, or software (e.g., mobile phone apps).

Figure 2:
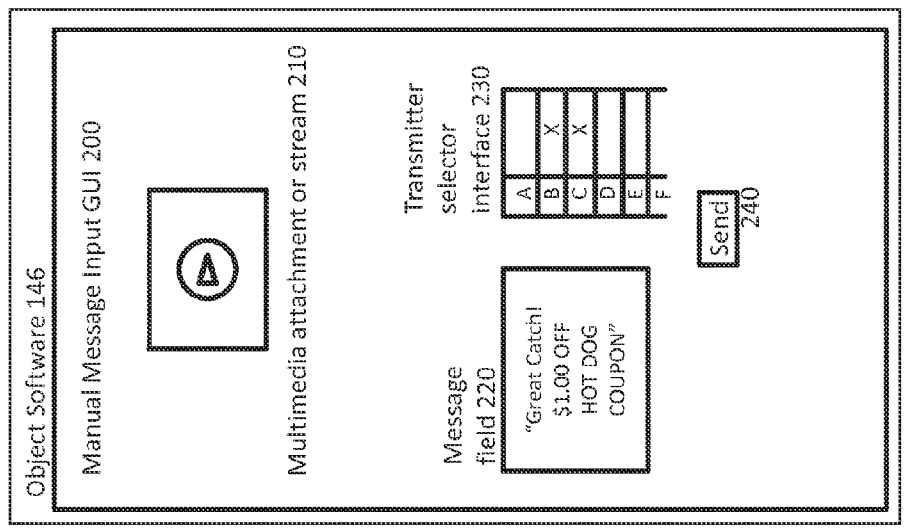
FIG. 2 illustrates an exemplary manual message input graphical user interface.

FIG. 2 illustrates an exemplary manual message input graphical user interface. In particular, the manual message input graphical user interface (GUI) 200 may be part of the object software 146, and may allow an administrator device (e.g., used by an administrator associated with the stadium 100, the wireless communication system 152, a team or performer, or some combination thereof.

The manual message input GUI 200 of FIG. 2 includes a multimedia attachment or steam 210. This may include video and/or audio of real-time live or past events within the stadium 100. For example, the multimedia attachment or steam 210 may include replays of various sport events, such as a goal or a touchdown or a foul, and may include announcer commentary, slow-motion, object tracking functionality (e.g., highlighting the ball 102 in the video), and multiple camera angles. The multimedia attachment or steam 210 may also include live video and/or audio data, so that the audience in the stadium can receive up-close live video shots, which may be particularly beneficial to audience members who are currently seated far away from the "action" or from a tracked object such as a ball 102. The multimedia attachment or steam 210 may also include live commentary (e.g., from sports announcers) for the benefit of audience members. The multimedia attachment or steam 210 may be saved in the message database 148 and associated with a particular event (e.g., a team scores a touchdown), or may be provided at different times than the messages in the message database 148 (e.g., a live stream can be made constantly available through the transmitters, while particular replays of important events may be provided additionally as indicated by the message database 148). The multimedia attachment or steam 210 may then be transmitted as part of the message through the transmitters to the user devices associated with audience members in the transmission zones of the transmitters.

The manual message input GUI 200 of FIG. 2 also includes a message field 220, which allows the input of a text and/or image portion message (e.g., "Great Catch! $1.00 OFF HOT DOG COUPON"). The message from the message field 220 may then be input into the message database 148. The message from the message field 220 may be transmitted as part of a message through the transmitters to the user devices associated with audience members in the transmission zones of the transmitters.

The manual message input GUI 200 of FIG. 2 also includes a transmitter selector interface 230. The transmitter selector interface 230 allows the administrator to select which transmitters (e.g., Transmitter A 104, Transmitter B 106, Transmitter C 108, Transmitter D 110, Transmitter E 112, and/or Transmitter F 114) should be used to transmit the multimedia attachment or stream 210 and the message identified in the message field 220. In FIG. 2, an administrator has selected Transmitter B 106 and Transmitter C 108.

The manual message input GUI 200 of FIG. 2 also includes a "Send" button 240. The "Send" button may save the multimedia attachment or stream 210 and/or the message identified in the message field 220 into the message database 148. The "Send" button may also trigger the actual transmission of the multimedia attachment or stream 210 and/or the message identified in the message field 220 through the transmitters of stadium 100 via the transmitter hardware controller 150.

FIG. 3 is a flow diagram illustrating exemplary automatic communication operations.

The automatic communication operations 300 of FIG. 3 may be performed, at least in part, by the object software 146. The automatic communication operations 300 of FIG. 3 are described in the context where the tracked object is the ball 102, but it should be understood that the tracked object may be a different type of object as described in relation to FIG. 1A.

The operations 300 may include setting the message database 148 to a first record (step 305). The operations 300 may then include receiving a location of the ball 102 (e.g., as part of the 3D Object Tracking Data 144) from the object tracker system 142 (step 310). In some cases, the location of the ball 102 may be received only after the ball 102 stops, while in other cases, the location of the ball 102 may be received while the ball 102 is moving.

The operations 300 may also include calculating the distance from the ball 102 to each of the transmitters associated with the stadium 100 (step 315). The operations 300 may then include determining the nearest transmitter (step 320).

The operations 300 may also include obtaining a message from the message database 148 for the next message to the sent out (step 325). The next message may be based on a movement parameter of the ball 102, such as the location detected in step 310, a distance that the ball 102 has moved, a speed/velocity/momentum of the ball 102 during its trajectory, a height of the trajectory of the ball 102, or some combination thereof. The next message may in some cases be based on the distance between the ball 102 and one or more particular transmitters as well.

The operations 300 may then include sending the message to the nearest transmitter to the ball 102 as determined in step 320 (step 330). The message may also be sent to additional transmitters. The message may alternately be sent to the farthest transmitter from the ball 102.

Once the message has been sent to one or more transmitters in step 330 for transmission to various user devices, the operations 300 may then obtain the location of the ball 120 once again. If the ball 102 has not moved (step 340), the operations 300 may then continue to continuously or periodically poll for the location of the ball (step 330). If the location of the ball 120 has changed (step 340), the operations 300 may then increment the message record of the message database 148 (step 345) and return to step 310 to determine and use the location of the ball 102.

FIG. 4 illustrates an exemplary message database.

The exemplary message database 148 of FIG. 4 includes three columns. The first column is a record identifier column 410, which identifies each "row" as a record or database entry. The second column is a distance column 420, which identifies a distance or distance range corresponding to a message identified in a third "generic message" column 430.

The first two records in the exemplary message database 148 of FIG. 4 ("record 1" and "record 2" as identified in column 410) both correspond to a distance range of 1-5 yards (column 420), but each correspond to different messages (column 430), namely "Let's Go Team!" and "We Can Do It Team!," respectively. Such alternate messages may be included so that the same message isn't used over and over again for events that occur with relative frequency. As the operations 300 of FIG. 3 describe, the object software 146 may increment through the message database 148 after a message is sent, thereby allowing messages to alternate. In some cases, however, more than one message may be sent, in which case the "record 1" message and "record 2" message could both be sent if the ball 120 travels 1-5 yards.

The third record ("record 3" as identified in column 410) of FIG. 4 indicates that when the ball 102 travels 5-10 yards (column 420), a message (column 430) saying "What Great Progress!" should be transmitted. The fourth record ("record 4" as identified in column 410) of FIG. 4 indicates that when the ball 102 travels 10-50 yards (column 420), a message (column 430) saying "Wow! Let's give them a cheer!" should be transmitted. The fifth record ("record 5" as identified in column 410) of FIG. 4 indicates that when the ball 102 travels over 50 yards (column 420), a message (column 430) saying "Wow, what a play! $1.00 OFF Miller Beer Use This Coupon" should be transmitted, along with a barcode image corresponding to a coupon code for a discount on a beer product. Such a coupon may be redeemable, for example, at a shop within or associated with the stadium 100.

Other images may be included with the messages of the message database 148 besides the barcode of record 5. Also, as depicted in FIG. 2, the message database 148 may also identify a multimedia attachment or stream 210, which may take the form of a video, audio, or a hyperlink or pointer to such multimedia content (e.g., a hyperlink to a website or mobile application hosting a streaming video service).

FIG. 5 illustrates exemplary alternate automatic communication scenarios. The exemplary alternate automatic communication scenarios, which may be at least partially executed by the object software 146, present alternatives to the automatic communication operations 300 of FIG. 3.

For example, communication scenario 510 indicates that the object software 146 may use the height of the ball 102 to trigger a message, such as "what a great field goal!" Such a message, as well as the predetermined trigger height, may be included as a record in the message database 148.

Communication scenario 520 indicates that the object software 146 may send video (e.g., as the multimedia attachment or stream 210 of the message) to be transmitted by the farthest transmitter from the ball 102 instead of by the closest transmitter to the ball 102, so that faraway audience members may enjoy a close-up view. In some cases, the message database 148 may identify which transmitters should be used to transmit a particular message, either specifically (e.g., Transmitter A 104 and Transmitter C 108) or relative to the location of the ball 102 (e.g., closest X transmitters to the ball 102, furthest Y transmitters from the ball 102, where X and Y are positive integers).

Communication scenario 530 indicates that the object software 146 may trigger a message to be sent when the ball 102 is close to a goal line of the stadium 100 (e.g., within a predetermined distance of the goal line), the message stating "Getting Close!" or a similar message. In some cases, the message database 148 may include a record identifying such a message, along with the predetermined distance from the goal line.

Communication scenario 540 indicates that the object software 146 may, using the 3d object tracking data 144, recognize a handoff (e.g., a pass) followed by a fumble of the ball 102 (e.g., by receiving an altimeter measurement indicating that the ball 102 has bounced off of the ground) and, in response, triggering a message to be sent to transmitters for transmission saying "Fumble! What a great game!" or a similar message. Communication scenario 550 indicates that the object software 146 may, using the 3d object tracking data 144, recognize when the ball 102 is out of the bounds of a playing area of the stadium 100, and, in response, triggering a message to be sent to transmitters for transmission saying "Out of bounds!" or a similar message. In some cases, the message database 148 may include a record identifying messages like the "fumble" message of scenario 540 or the "out of bounds" message of scenario 550, and may also identify a particular in-game situation in lieu of a distance (e.g., "fumble" in football, or "out of bounds" in football/soccer/basketball/tennis/volleyball, or "strike" or "ball" or "home run" in baseball, or "double dribble" or "basket" or "slam dunk" or "three pointer" in basketball, or "touchdown" in football, or "goal" in soccer/hockey, or "bogey" or "par" or "birdie" or "eagle" or "green" or "hazard" in golf, or "double bounce" in tennis or table tennis).

Figure 6:
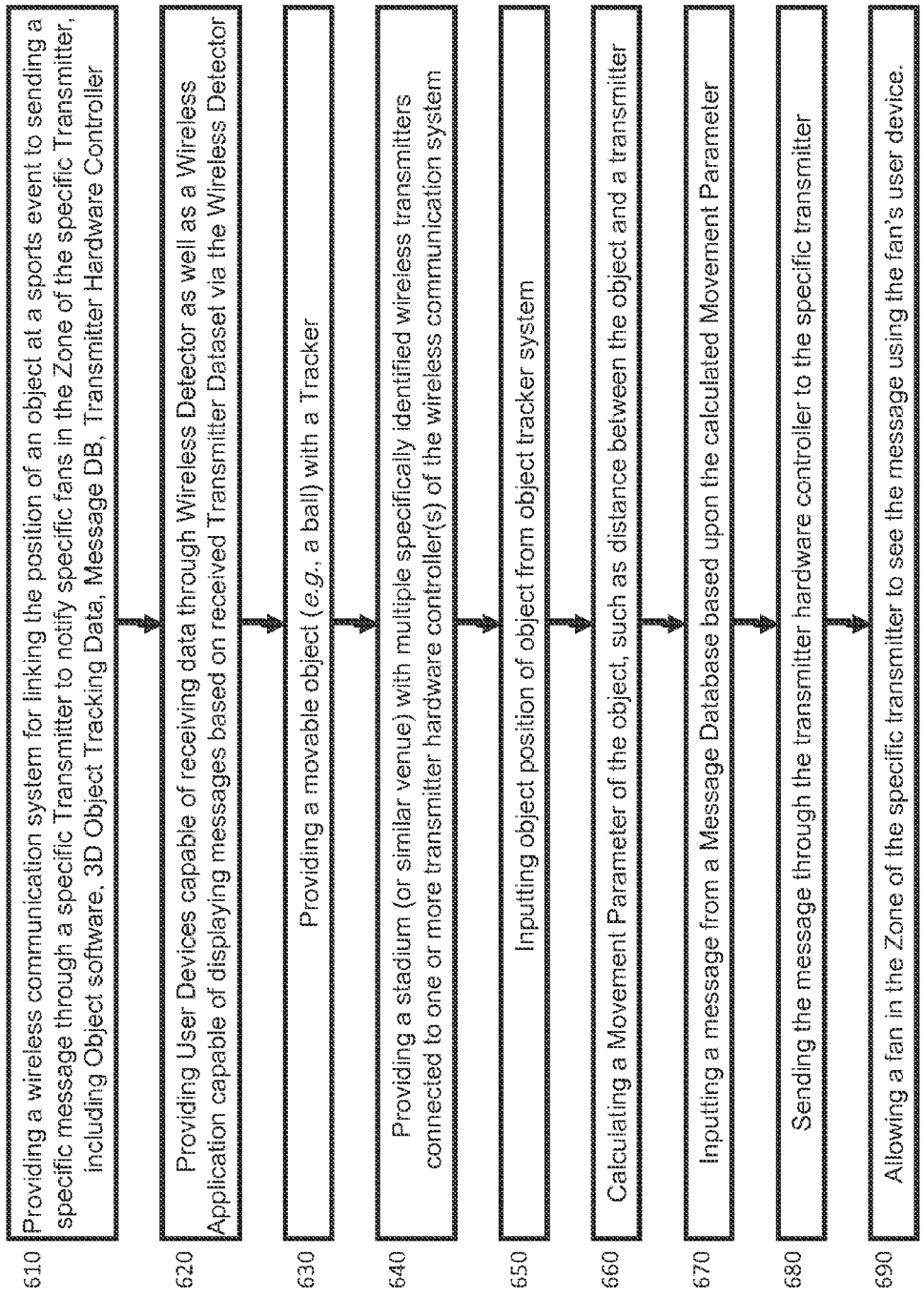
FIG. 6 illustrates an exemplary overall method of the present invention as described herein.

FIG. 6 illustrates an exemplary overall method of the present invention as described herein.

The operations of FIG. 6 include, in step 610, providing a Wireless Communication System 152 for linking the position of a movable object (e.g., a ball 102) at a sports event to sending a specific message through a specific transmitter to notify specific fans in the transmission zone of the specific transmitter, including object software 146, 3D object tracking data 144, a message database 148, and a transmitter hardware controller 150.

The operations of FIG. 6 include, in step 620, providing user devices 130 capable of receiving data through a wireless detector 132 as well as a wireless application 134 capable of displaying messages based on a transmitter dataset received via the wireless detector 132.

The operations of FIG. 6 include, in step 630, providing a movable object (e.g., a ball 102) with a tracker 140.

The operations of FIG. 6 include, in step 640, providing a stadium 100 (or similar venue) with multiple specifically identified wireless transmitters connected to one or more transmitter hardware controller(s) 150 of the wireless communication system 152.

The operations of FIG. 6 include, in step 650, inputting object position of object from object tracker system 142.

The operations of FIG. 6 include, in step 660, calculating a movement parameter of the object, such as distance between the object and a transmitter.

The operations of FIG. 6 include, in step 670, inputting a message from a message database 148 based upon the calculated movement parameter.

The operations of FIG. 6 include, in step 680, sending the message through the transmitter hardware controller 150 to the specific transmitter.

The operations of FIG. 6 include, in step 690, allowing an audience member or fan in the transmission zone of the specific transmitter to receive and read/see the message using the a user device 130 associated with the audience member or fan.

FIG. 7 illustrates an exemplary computing system 700 that may be used to implement an embodiment of the present invention. The computing system 700 of FIG. 7 includes one or more processors 710 and memory 710. Main memory 710 stores, in part, instructions and data for execution by processor 710. Main memory 710 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 710 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 710.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for communication based on object tracking, the method comprising:
    storing a plurality of messages in a message database prior to an event, wherein each message is associated with a range of movement values of a plurality of ranges of movement values;
    receiving tracking information regarding a movable object within an event venue during an event;
    calculating a movement parameter value based on the tracking information;
    identifying that the movement parameter value falls within a first range of movement values of the plurality of ranges of movement values in the message database, wherein the first range of movement values corresponds to a first message of the plurality of messages in the message database;
    retrieving the first message of the plurality of messages from the message database during the event in response to the identification that the movement parameter value falls within the first range of movement values, wherein the first message is distinct from both the movement parameter value and the tracking information; and transmitting the first message to a user device in the event venue via a wireless transmitter.

2. The method of claim 1, wherein the movement parameter value is a distance value corresponding to a distance of a trajectory of the movable object.

3. The method of claim 1, wherein the movement parameter value corresponds to a movement of the movable object, and wherein the movement parameter value is one of a speed value, a velocity value, or a momentum value.

4. The method of claim 1, wherein the movement parameter value is a height value corresponding to a point in a trajectory of the movable object.

5. The method of claim 1, further comprising identifying the wireless transmitter based on the tracking information.

6. The method of claim 5, wherein the wireless transmitter is the closest wireless transmitter to the movable object of a plurality of wireless transmitters associated with the venue.

7. The method of claim 5, wherein the wireless transmitter is the farthest wireless transmitter from the movable object of a plurality of wireless transmitters associated with the venue.

8. The method of claim 1, further comprising transmitting the message using one or more additional wireless transmitters other than the identified wireless transmitter.

9. The method of claim 1, wherein the event venue is a sport venue.

10. The method of claim 1, wherein the movable object is one of a ball, a puck, a frisbee, or a shuttlecock.

11. A system for communication based on object tracking, the system comprising:
   a wireless receiver that receives tracking information, the tracking information describing a movable object within an event venue during an event;
   a memory storing instructions, and storing a plurality of messages in a message database prior to the event, wherein each message is associated with a range of movement values of a plurality of ranges of movement values; and
   a processor coupled to the memory, wherein execution of the instructions by the processor causes the system to:
      calculate a movement parameter value based on the tracking information,
      identify that the movement parameter value falls within a first range of movement values of the plurality of ranges of movement values in the message database, wherein the first range of movement values corresponds to a first message of the plurality of messages in the message database,
      retrieve the first message of the plurality of messages from the message database during the event in response to the identification that the movement parameter value falls within the first range of movement values, wherein the first message is distinct from both the movement parameter value and the tracking information, and
      transmits the first message to a user device in the event venue via a wireless transmitter.

12. The system of claim 11, wherein the movement parameter value is a distance value corresponding to a distance of a trajectory of the movable object.

13. The system of claim 11, wherein the movement parameter value corresponds to a movement of the movable object, and wherein the movement parameter value is one of a speed value, a velocity value, or a momentum value.

14. The system of claim 11, wherein the movement parameter value is a height value corresponding to a point in a trajectory of the movable object.

15. The system of claim 11, wherein execution of the instructions by the processor identifying the wireless transmitter based on the tracking information.

16. The system of claim 15, wherein the wireless transmitter is the closest wireless transmitter to the movable object of a plurality of wireless transmitters associated with the venue.

17. The system of claim 15, wherein the wireless transmitter is the farthest wireless transmitter from the movable object of a plurality of wireless transmitters associated with the venue.

18. The system of claim 11, wherein execution of instructions stored in the memory by the processor further transmits the message using one or more additional wireless transmitters other than the identified wireless transmitter.

19. The system of claim 11, wherein the movable object is one of a ball, a puck, a frisbee, or a shuttlecock.

20. A non-transitory computer-readable storage medium, having embodied thereon a program executable by a processor to perform a method for communication based on object tracking, the method comprising:
   storing a plurality of messages in a message database prior to an event, wherein each message is associated with a range of movement values of a plurality of ranges of movement values;
   receiving tracking information regarding a movable object within an event venue during an event;
   calculating a movement parameter value based on the tracking information;
   identifying that the movement parameter value falls within a first range of movement values of the plurality of ranges of movement values in the message database, wherein the first range of movement values corresponds to a first message of the plurality of messages in the message database;
   retrieving the first message of the plurality of messages from the message database during the event in response to the identification that the movement parameter value falls within the first range of movement values, wherein the first message is distinct from both the movement parameter value and the tracking information; and
   transmitting the first message to a user device in the event venue via a wireless transmitter.

\* \* \* \* \*